No. 613,307. Patented Nov. 1, 1898.
J. M. RANKIN.
WHEEL FOR VEHICLES.
(Application filed May 25, 1897.)
(No Model.)
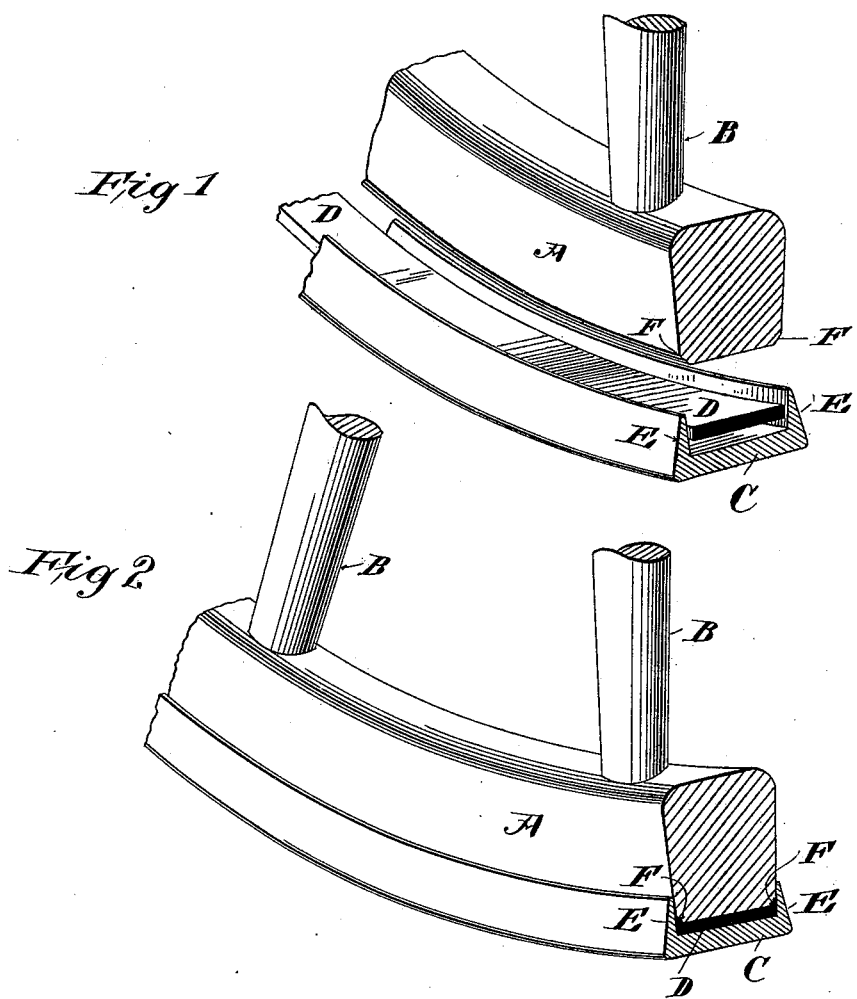
Attest:
C. N. Benjamin
H. P. Morrison
James M. Rankin, Inventor.
By Phillips Abbott
atty
THE NORRIS PETERS CO., PHOTO-LITHO., WASHINGTON, D. C.

UNITED STATES PATENT OFFICE.

JAMES M. RANKIN, OF NEW YORK, N. Y., ASSIGNOR, BY MESNE ASSIGNMENTS, TO THE DUBOIS CUSHION TIRE COMPANY.

WHEEL FOR VEHICLES.

SPECIFICATION forming part of Letters Patent No. 613,307, dated November 1, 1898.

Application filed May 25, 1897. Serial No. 638,159. (No model.)

*To all whom it may concern:*

Be it known that I, JAMES M. RANKIN, a citizen of the United States, and a resident of New York, (Astoria,) in the county of Queens and State of New York, have invented certain new and useful Improvements in Wheels for Vehicles, of which the following is a specification.

This invention relates to wheels for vehicles; and the object of the invention is to provide an improved wheel the felly of which is provided with beveled outer edges for the purposes hereinafter set forth.

Referring to the drawings hereof, Figure 1 illustrates a perspective view of the invention, the tire, cushion, and felly or rim all being separated from each other. Fig. 2 illustrates a perspective view of the parts shown in Fig. 1 when combined in finished operative condition.

A is the felly or rim.

B are the spokes.

C is the tire.

D is the cushion, which is preferably made of rubber or rubber composition, although other equivalent material may be employed. As shown in the figures, its width is the same as that of the bottom of the groove between the flanges E E of the tire. These flanges are permanently rigid, so that the tire at all times is in the form of a continuous ring-like gutter or channel-iron. The inner surfaces of the flanges have preferably the same taper as the outer side surfaces of the rim. At the outer edges of the rim its corners are chamfered or beveled off, as shown at F F. The purpose of beveling the edges F F is this: I prefer that the cushion D should exactly fill the space intended for it between the tire and the rim, having good firm contact with both of these parts without being subjected to pressure, which would tend to distort the cushion by compression, because that is theoretically the best construction, since then the cushion acts merely as a non-transmitting body interposed between the tire, upon which the shocks are received, and the wheel, to which they should not be transmitted; but in practice it is found impossible to so accurately adjust the tire-setting devices and to so exactly use them that the parts shall attain their stated condition because of the inevitable inaccuracies in constructing the parts involved. I therefore provide the small spaces within the tire, furnished by the beveling of the corners F F, as a relief for the tire in the event of its being subjected to such pressure as to induce compression, for, if so, the excess of the rubber or equivalent material will move into the small spaces referred to. I wish it distinctly understood that these beveled edges F F are not employed for the purpose of enabling me to use a cushion too large for the place designed for it. On the contrary, it is my express intent to use a cushion large enough to exactly fill that space and no larger; but since, as above stated, it is in practice impossible to regulate the manufacture with this exactness I bevel the edges solely for the reasons stated. The cushion may, if desired, be pressed into the groove or gutter of the tire, which is a continuous ring, and cemented therein with any cementitious material. It is then brought into proper position relative to the felly of the wheel and maintained thereon in any well-known and suitable manner.

It will be obvious to those who are familiar with this art that by my invention I avoid the defects inherent in the old forms of tire. I do not rely upon bolts or any other means of holding the tires to the rims. The flanges do that work entirely, although, if desired, bolts may be employed as additional security; also, my tires being continuous rings there are no ends to work loose; also, the rim is not cut or reduced in thickness at any part by the necessity for fastening bolts or clips of any kind; also, there is no yielding or movement of the tire relative to the rim. The cushion is used merely as a non-transmitting device and not as a spring or yielding device; also, since the flanges do not require rolling or other manipulation to any considerable extent they may be as hard as the face of the tire itself, and thus a more secure structure result, and being hard and rigid they truss the tire on both sides, thus preventing the tendency of the rim to flatten between spokes, and since there is no exudation or bulging of the cushion the flanges make intimate contact with the sides of the rim throughout, precluding the entrance of moisture.

I claim—

A wheel comprising a tapered felly having a beveled edge at each outer side thereof adapted to fit within a flanged tire; a tire provided with a pair of inwardly-extending tapering flanges fitting over said tapered felly, and the innermost points of said beveled edges; and a rubber ring intermediate said felly and tire and having a pair of projecting portions extending between the inner faces of said tire-flanges and the beveled faces of said felly, substantially as shown and described.

Signed at New York, in the county of New York and State of New York, this 22d day of May, A. D. 1897.

JAMES M. RANKIN.

Witnesses:
F. S. BIDLINGMEYER,
A. B. MORRISON.